United States Patent
Shannon et al.

(10) Patent No.: US 7,757,045 B2
(45) Date of Patent: Jul. 13, 2010

(54) SYNCHRONIZING RECENCY INFORMATION IN AN INCLUSIVE CACHE HIERARCHY

(75) Inventors: Christopher J. Shannon, Grayslake, IL (US); Ronak Singhal, Portland, OR (US); Per Hammarlund, Hillsboro, OR (US); Hermann Gartler, Portland, OR (US); Glenn Hinton, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 962 days.

(21) Appl. No.: 11/374,222

(22) Filed: Mar. 13, 2006

(65) Prior Publication Data

US 2007/0214321 A1    Sep. 13, 2007

(51) Int. Cl.
    *G06F 12/00* (2006.01)
(52) U.S. Cl. .................. 711/122; 711/100; 711/119; 711/154
(58) Field of Classification Search .......... 711/100, 711/119, 122, 133, 136, 141, 154, 159–160
    See application file for complete search history.

(56) References Cited

U.S. PATENT DOCUMENTS

| | | | |
|---|---|---|---|
| 5,590,308 A | 12/1996 | Shih | 395/463 |
| 5,809,526 A | 9/1998 | Patel | 711/122 |
| 6,970,976 B1 * | 11/2005 | Arimilli et al. | 711/122 |
| 7,228,388 B2 * | 6/2007 | Hu et al. | 711/138 |
| 2002/0112124 A1 | 8/2002 | Arimilli et al. | 711/122 |
| 2004/0260880 A1 | 12/2004 | Shannon et al. | 711/122 |
| 2009/0019306 A1 | 1/2009 | Hum et al. | |

FOREIGN PATENT DOCUMENTS

| | | |
|---|---|---|
| CN | 1609823 | 4/2005 |
| JP | 61-229142 | 10/1986 |

OTHER PUBLICATIONS

State Intellectual Property Office, P.R. China, First Office Action dated Oct. 10, 2008, with English, language translation.
U.S. Appl. No. 11/087,916, filed Mar. 22, 2005, entitled "A Cache Eviction Technique For Reducing Cache Eviction Traffic" by Christopher J. Shannon, Mark Rowland, Ganapati Srinivasa.

(Continued)

*Primary Examiner*—Jasmine Song
(74) *Attorney, Agent, or Firm*—Trop, Pruner & Hu, P.C.

(57) ABSTRACT

In one embodiment, the present invention includes a method for receiving a cache access request for data present in a lower-level cache line of a lower-level cache, and sending recency information regarding the lower-level cache line to a higher-level cache. The higher-level cache may be inclusive with the lower-level cache and may update age data associated with the cache line, thus reducing the likelihood of eviction of the cache line. Other embodiments are described and claimed.

23 Claims, 6 Drawing Sheets

OTHER PUBLICATIONS

U.S. Appl. No. 10/897,474, filed Jul. 23, 2004, entitled "A Cache Eviction Technique For Inclusive Cache Systems" by Christopher J. Shannon, Mark Rowland, Ganapati Srinivasa.

German Patent and Trademark Office, Office Action dated Sep. 23, 2008, with English language translation.

Nathan N. Sadler, et al., "Choosing an Error Protection Scheme for a Microprocessor's L1 Data Cache," Oct. 2006, pp. 1-7.

United States Patent and Trademark Office, Office Action mailed October 27, 2009 with Reply to Office Action filed on Jan. 26, 2010 in related U.S. Appl. No. 11/827,197.

State Intellectual Property Office, P.R. China, Second Office Action dated Sep. 11, 2009, in a related application.

German Patent and Trademark Office, Office Action dated Jan. 25, 2010 in German patent application No. 10 2007 012 058.5.

* cited by examiner

SYNCHRONIZING RECENCY INFORMATION IN AN INCLUSIVE CACHE HIERARCHY

BACKGROUND

Embodiments of the present invention relate to processors and more particularly to processors of a system having a multiple-level cache hierarchy.

Many systems include one or more cache memories to temporarily store data in closer relation to a processor in which the data will be used. In this way, decreased data retrieval times can be realized by the processor, improving performance. Multiple levels of cache memory may be present in certain systems. These cache levels may include a so-called level zero (L0) cache memory that can be present within a processor, as well as a so-called level one (L1) cache memory that also can be present within the processor. Additional levels of cache memories, either within the processor or closely coupled thereto, may further be present in various systems.

In some systems, multiple levels of cache memory may be implemented as an inclusive cache hierarchy. In an inclusive cache hierarchy, one of the cache memories (i.e., a lower-level cache memory) includes a subset of data contained in another cache memory (i.e., an upper-level cache memory). Cache hierarchies may improve processor performance, as they allow a smaller cache having a relatively fast access speed to contain frequently used data. In turn, a larger cache having a slower access speed than the smaller cache stores less-frequently used data (as well as copies of the data in the lower-level cache). Typically, the lower-level cache memories of such an inclusive cache hierarchy are smaller than the higher-level cache memories.

Because inclusive cache hierarchies store some common data, eviction of a cache line in one cache level may cause a corresponding cache line eviction in another level of the cache hierarchy to maintain cache coherency. More specifically, an eviction in a higher-level cache causes an eviction in a lower-level cache. Various eviction schemes can be used in different cache memories. One common eviction scheme is known as a least recently used (LRU) scheme in which a least recently used cache line is selected for eviction. Accordingly, each cache line may have recency information associated with it to indicate its age with respect to other cache lines in the cache. Additional caching techniques include associating state data with cache lines to indicate accessibility and/or validity of cache lines. For example, state data may include the following states: modified (M), exclusive (E), shared (S), and/or invalid (I), otherwise known as so-called MESI states.

Using conventional eviction techniques, cache lines in a higher-level cache may be evicted as being stale (i.e., a least recently used cache line) although a corresponding copy of that cache line in a lower-level cache may be heavily accessed by a processor. In hierarchies having inclusivity, when a higher-level cache line is evicted, a corresponding cache line in a lower-level cache must also be explicitly invalidated. Such lower-level invalidated cache lines may include data that is frequently accessed by the processor, causing unnecessary cache misses. These cache misses require significant latencies to obtain valid data from other memory locations, such as a main memory.

Furthermore, problems occur when an inclusive cache hierarchy has a higher-level cache that is shared among multiple processors, for example, multiple cores of a multi-core processor. In this scenario, each core occupies at least some cache lines in the higher-level cache, but all cores contend for the shared resource. When one of the cores uses a small working set which fits inside its lower-level cache, this core rarely (if ever) would have to send requests to the higher-level cache since the requests hit in its lower-level cache. As a result, this core's lines in the higher-level cache become stale regardless of how often the core uses them. When sharing the higher-level cache with other cores that continually allocate cache lines into the higher-level cache, this core's data is evicted, causing performance degradation.

DETAILED DESCRIPTION

Embodiments of the present invention may be used to synchronize age information (also referred to herein as recency or LRU information) between multiple levels of a cache hierarchy. More particularly, synchronization messages that provide recency data may be used to synchronize this recency data between multiple levels of an inclusive cache hierarchy. In this manner, a higher-level cache may be updated with information regarding the usage of corresponding cache lines in a lower-level cache. As a result, evictions from the higher-level cache may consider the correct age information for its cache lines that are also present in the lower-level cache(s). Accordingly, cache lines of a lower-level cache that are frequently accessed by a processor may be less likely to be evicted from the higher-level cache, improving performance. In other words, more recently used cache lines of a lower-level cache may be maintained in corresponding cache lines of a higher-level cache, reducing performance penalties that would result from cache misses in the lower-level cache.

Still further, in embodiments in which a multi-core processor or other multiprocessor system is present, providing this LRU information may prevent one core from causing excessive evictions from a higher-level cache. In this way, a core that has fewer cache misses can send LRU information from lower-level caches associated with it to a higher-level cache in order to prevent the associated cache lines from being evicted (both in the higher-level cache and in the lower-level cache).

Although LRU information transmitted in accordance with an embodiment of the present invention can prevent undesired evictions, increased bus traffic may result. Accordingly, some embodiments may incorporate throttling mechanisms to throttle transmission of synchronization messages based on various system criteria. For example, only a certain number of such synchronization messages may be sent in a given time interval. Further, a core may prevent the transmission of synchronization messages when a significant amount of other transaction traffic is occurring, as the synchronization traffic may block the progression of useful work.

As will be described herein, various hardware, software, firmware and/or combinations thereof may be implemented to perform methods in accordance with embodiments of the present invention. Furthermore, while described herein particularly with regard to a multi-core processor, it is to be understood that the scope of the present invention is not so limited and embodiments may be implemented in other systems including an inclusive cache hierarchy, and other systems lacking such a hierarchy but maintaining other inclusive data structures such as snoop filters or the like.

Figure 1:
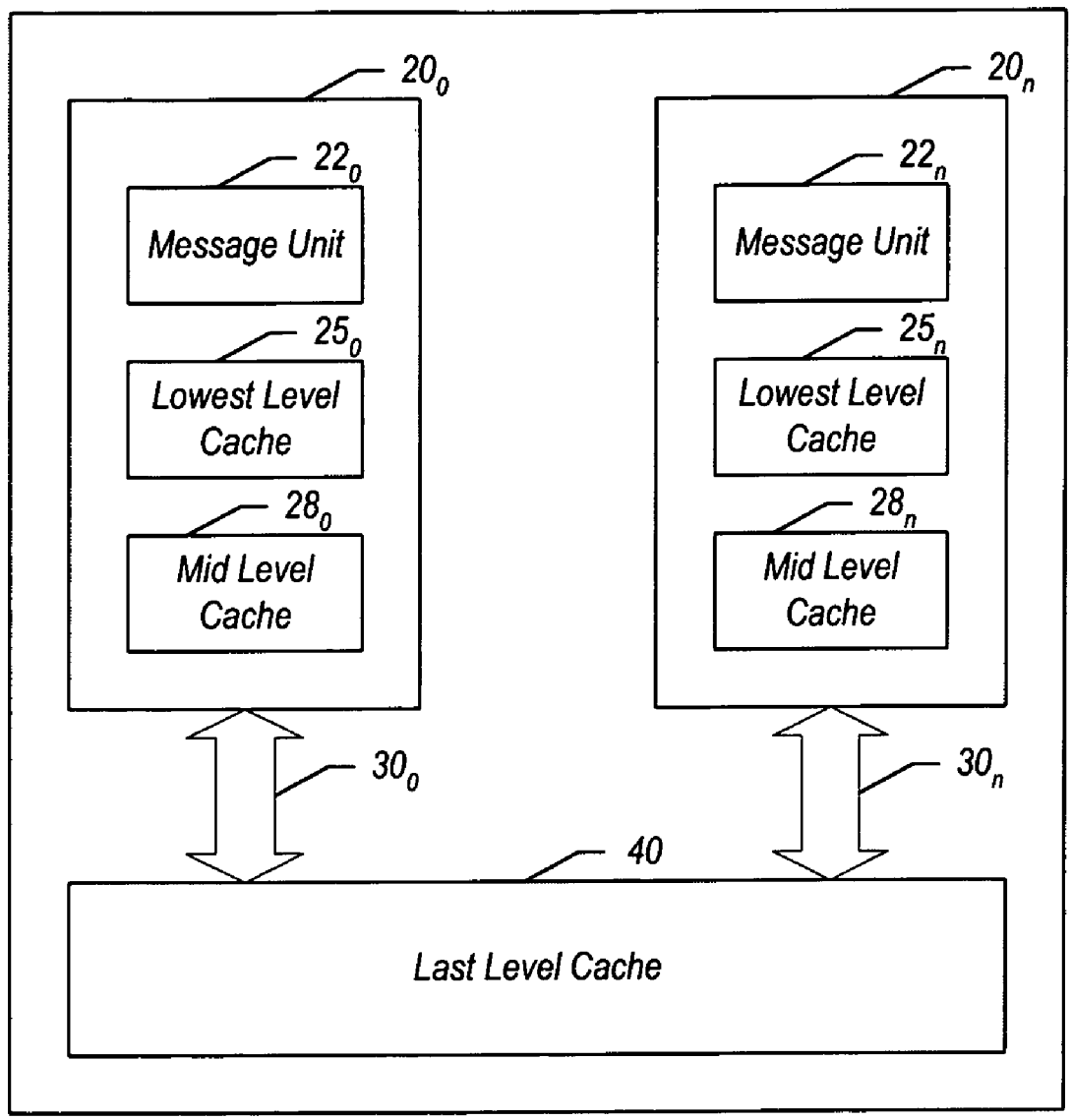
FIG. 1 is a block diagram of a processor in accordance with one embodiment of the present invention.

Referring now to FIG. 1, shown is a block diagram of a processor in accordance with one embodiment of the present invention. As shown in FIG. 1, processor 10 may be a multi-core processor including a plurality of processor cores $20_0$-$20_n$ (generically core 20). As shown in FIG. 1, each core may include multiple levels of a cache hierarchy. Specifically, as shown in FIG. 1, each core 20 may include a lowest-level cache $25_0$-$25_n$ (generically cache 25). In one embodiment, cache 25 may correspond to an L0 cache, although the scope of the present invention is not so limited. Each core 20 may further include a mid-level cache $28_0$-$28_n$ (generically cache 28). Mid-level cache 28 may correspond to an L1 cache, in some embodiments. As further shown in FIG. 1, each core 20 further includes a message unit $22_0$-$22_n$ (generically message unit 22). As will be described further below, message unit 22 may be used to generate and transmit recency messages.

Processor 10 may further include a last-level cache (LLC) 40, which may be a higher-level cache that includes copies of the data present in the lower-level caches. As shown in FIG. 1, each core 20 may be coupled to LLC 40 via a link $30_0$-$30_n$ (generically link 30) so that LLC 40 acts as a shared memory.

In various embodiments, processor 10 may include an inclusive cache hierarchy. For example, in the inclusive cache hierarchy of FIG. 1, cache 25 may include a subset of the data within cache 28, while in turn cache 28 may include a subset of the data in cache 40. To maintain cache coherency upon an eviction of a cache line from last-level cache 40, corresponding cache lines in a given mid-level cache 28 and lowest-level cache 25 may also be evicted, in some embodiments.

During operation, memory requests from execution units of a given core (not shown in FIG. 1) may first access the lowest-level of the cache hierarchy before looking up any other caches within a system. Accordingly, for improved performance frequently accessed data may be present in the lowest possible cache level, i.e., cache 25. If the requested data is not present in cache 25, cache 28 may next be accessed to determine if the data is present there. In the embodiment shown in FIG. 1, each mid-level cache 28 is a final lookup point for each core 20 before a request is issued to LLC 40, which is a shared cache among the multiple cores.

In various embodiments, a set of explicit messages may be used to communicate LRU information between a core and one or more of its corresponding higher-level caches. In this way, age or recency information may be updated in the higher-level caches, reducing eviction of cache lines associated with frequently used lower-level cache lines. These recency messages may be read requests for transactions that hit inside a lower-level cache, and may be provided from message unit 22. In various embodiments, these read requests may be requests that seek data of a zero length. In other words, these read requests do not request return of data to the core. Instead, these read requests are used by the higher-level cache to update its recency information without reading out the corresponding cache line.

Figure 2:
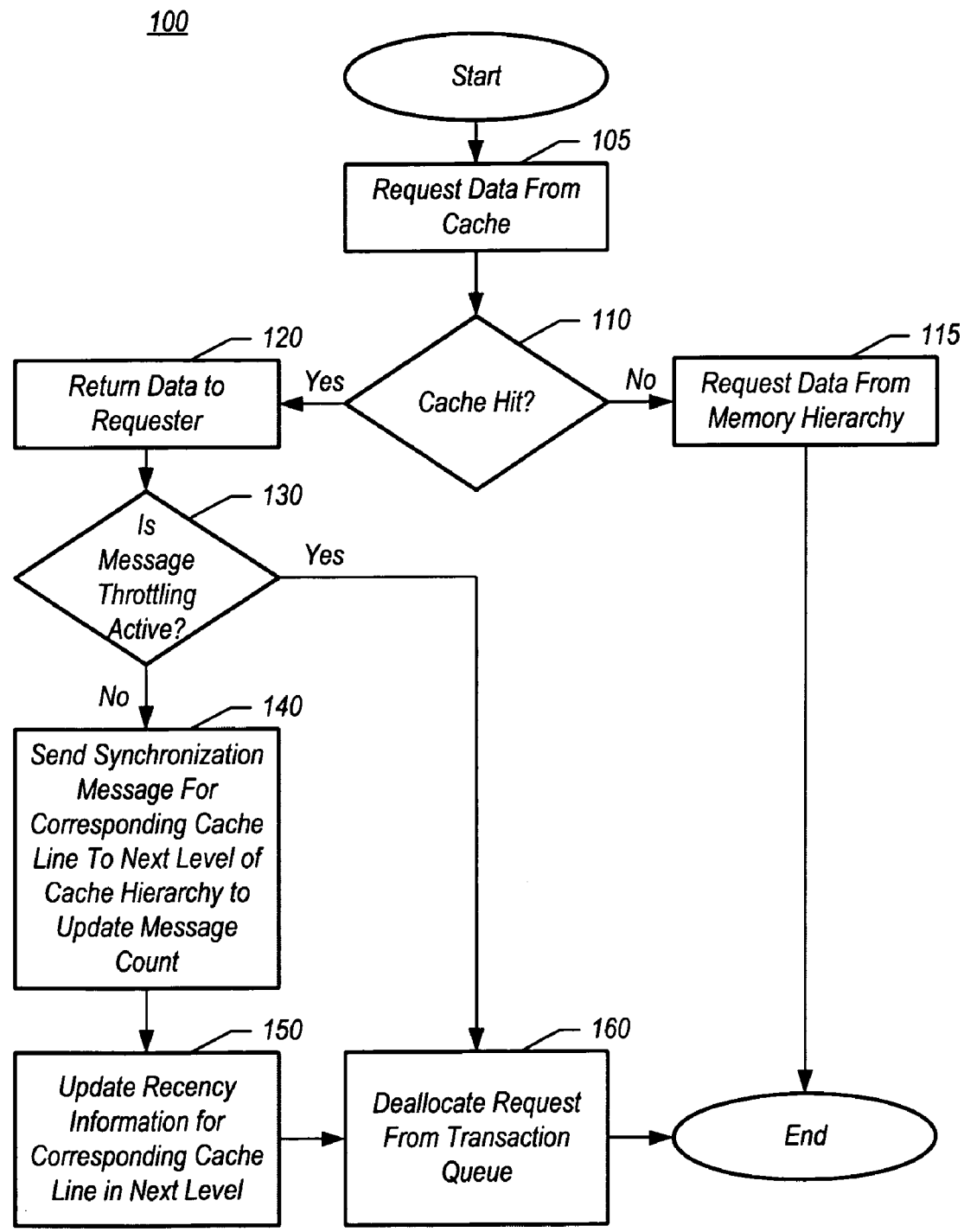
FIG. 2 is a flow diagram of a synchronization method in accordance with one embodiment of the present invention.

Referring now to FIG. 2, shown is a flow diagram of a method in accordance with one embodiment of the present invention. Method 100 may be used to access requested data from a lower-level cache and provide recency information to a higher-level cache upon a hit in the lower-level cache. In one embodiment, method 100 may be implemented in a cache controller of a processor core. As shown in FIG. 2, method 100 may begin by requesting data from a cache (block 105). For example, a processor core may request data from a lowest-level cache. Next, it may be determined whether there is a cache hit in the lowest-level cache (diamond 110).

If there is a cache miss (i.e., the data is not present in the lowest-level cache), control passes to block 115. There the requested data may be obtained from a memory hierarchy (block 115). As shown in FIG. 2, method 100 may conclude at this point, and the requested data may be accessed in a conventional manner, for example.

Still referring to FIG. 2, if instead at diamond 110 it is determined that there is a cache hit, control passes to block 120. There, the requested data may be returned to the requester (block 120). That is, the cache line including the requested data may be sent from the lower-level cache to the processor core. Next it may be determined whether message throttling is activated (diamond 130). As will be described further below, such throttling may be activated to prevent certain message traffic from a lower-level cache to a higher-level cache. If throttling has not been activated, control passes from diamond 130 to block 140. Then a synchronization message for a corresponding cache line (i.e., the cache line of the lower-level cache subject to the hit) may be sent to a next level of a cache hierarchy (block 140). Note that these messages may be sent to one more cache levels and may originate from any desired level of a cache hierarchy. Furthermore, based on the synchronization message, a count of such messages sent (i.e., a message count) may be updated (still block 140).

Still referring to FIG. 2, recency information for the corresponding cache line may be updated in the next-level cache (block 150). As an example, the next-level cache memory may have a tag associated with the cache line updated to indicate that cache line as being the most recently used (MRU) cache line. Control passes from either of block 150 or diamond 130 to block 160. There, the request may be deallocated from a transaction queue (block 160). In other words, the initial processor request for the data may be deallocated from a buffer such as a transaction buffer that stores pending core transactions. Accordingly, method 100 concludes. While described with this particular implementation in the embodiment of FIG. 2, it is to be understood that the scope of the present invention is not so limited, and different manners of providing LRU information from a lower-level cache to a higher-level cache may be implemented.

By providing recency information from a lower-level cache to a higher-level cache, data most recently used in the lower-level cache (also present in an inclusive higher-level cache) may be updated in the higher-level cache as a most recently used cache line. In this way, this cache line may avoid eviction in the higher-level cache (and accordingly also in the lower-level cache).

Because synchronization messages sent between caches in an inclusive cache hierarchy also affect shared resources in a processor, such messages may actually cause performance degradation. Thus if the recency information being sent is not having a significant positive impact on caching behavior, the additional cache traffic can actually cause performance degradation. Accordingly, embodiments may throttle synchronization messages in various ways to limit the maximum bandwidth that can be used for such messages. In this way, potential performance gains of sending such messages may be maximized while minimizing any possible negative effects.

In various implementations, multiple mechanisms for throttling may be implemented. For example, counter-based throttling and occupancy-based throttling may be implemented in a given system. In one embodiment, a single bit of state may indicate whether synchronization messages can be sent at a given time. This bit, referred to herein as a hint bit, can be suppressed by either counter-based throttling and/or occupancy-based throttling to prevent synchronization messages from being sent. In one embodiment, a first throttling mechanism may be a counter-based approach, which effectively limits bandwidth available for synchronization messages. A configurable counter may be used to determine a time interval at which the hint bit may be set. Upon overflow of this counter, a new interval may be triggered. In various implementations, a separate counter may be used to track the number of synchronization messages sent in a given interval. The hint bit may be set at the beginning of each interval and cleared when the number of synchronization messages is exceeded for the interval. However, in some embodiments only a single message may be sent per interval and accordingly, the need for a second counter may be avoided.

A second throttling mechanism may be an occupancy-based approach that limits message bandwidth when a cache hierarchy is occupied with other useful work. For example, the number of requests pending in a cache hierarchy is analyzed to determine whether to implement occupancy-based throttling. In one embodiment, a common queuing structure in a core which may hold pending transactions is analyzed. More specifically, each entry in the queue may be analyzed so that only those transactions in a certain state may correspond to requests that are presently pending elsewhere in a cache hierarchy, in some embodiments. If the number of outstanding entries in a given time interval exceeds a threshold, synchronization messages are suppressed until a next interval.

Different throttling approaches may be implemented to set and clear the hint bit. In one example, the hint bit may be set when the first counter overflows, which indicates the start of a new interval. At this time, the number of outstanding entries in the transaction queue may be checked and compared to a threshold level. Only if the occupancy level of this queue is lower than the threshold may the hint bit actually be set. Otherwise, the bit is suppressed and cannot be set until the beginning of the next interval, regardless of any subsequent changes to occupancy of the queue.

Figure 3:
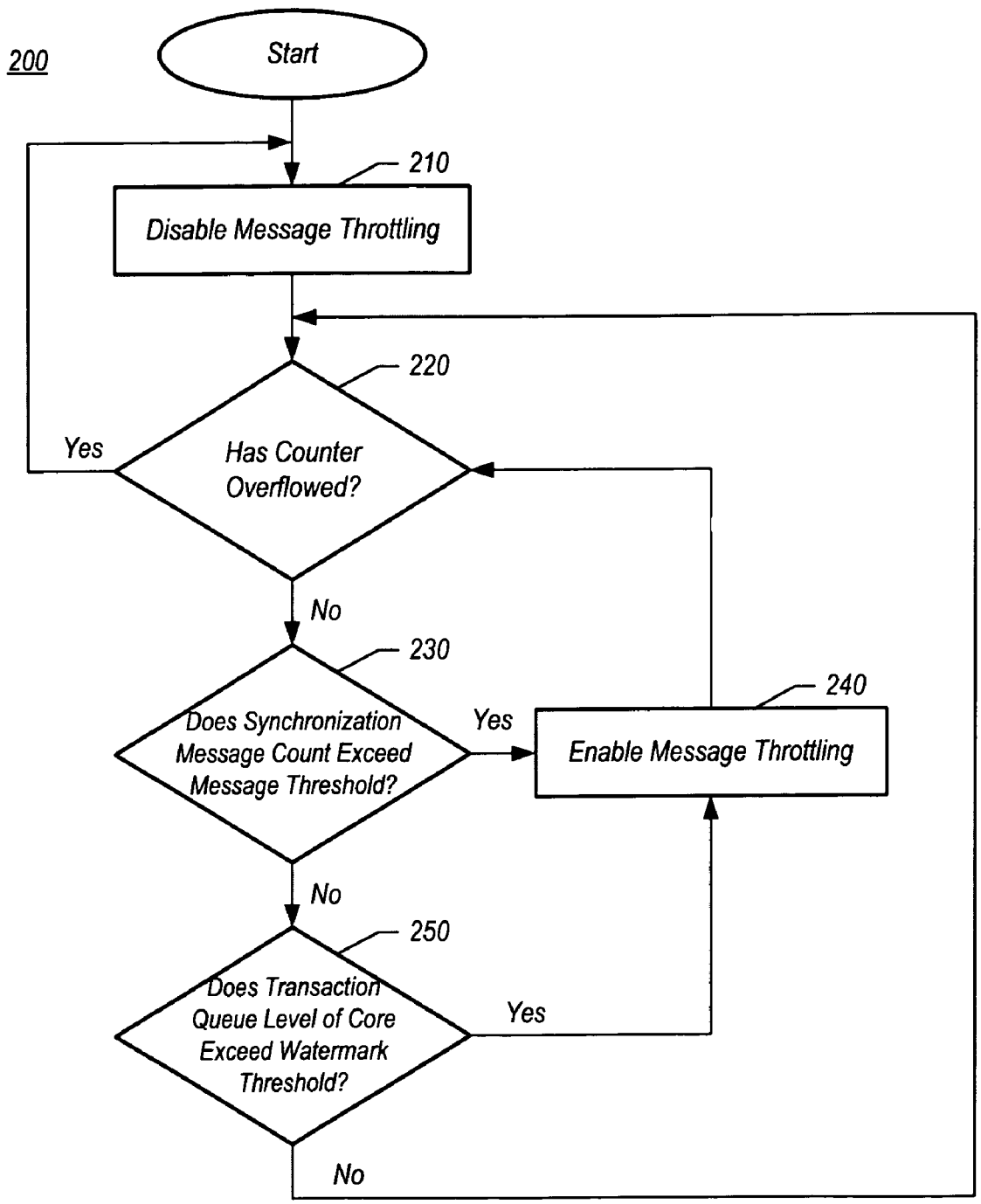
FIG. 3 is a flow diagram of a message throttling method in accordance with one embodiment of the present invention.

Referring now to FIG. 3, shown is a flow diagram of a message throttling method in accordance with one embodiment of the present invention. Method 200 may be performed to determine whether to throttle recency messages from a given core. As shown in FIG. 3, method 200 may begin by disabling message throttling, in other words, enabling synchronization messages (block 210). For example, upon initiation of a processor, synchronization messages may be enabled for transmission.

Next, it may be determined whether a counter has overflowed (diamond 220). This counter may be a counter that continually counts over a predetermined range of numbers. In various embodiments, this counter may either count cycles, events such as cache accesses, or the like. This counter may continuously increment its count until an overflow occurs. When the counter overflows, control passes back to block 210. There, message throttling (if activated) may be disabled.

Still referring to FIG. 3, if instead at diamond 220 it is determined that the counter has not overflowed, control passes to diamond 230, where it is determined whether a synchronization message count exceeds a message threshold (diamond 230). The synchronization message count may correspond to a number of synchronization messages sent during a given cycle of the counter (i.e., prior to counter overflow). Note that the message threshold may vary, and in different implementations may be user controlled. If the synchronization message count exceeds the message threshold, control passes to block 240, where message throttling is enabled. Accordingly, control returns to diamond 220 for continued determination of the count value of the counter.

If instead at diamond 230 it is determined that the synchronization message count does not exceed the message threshold, control passes to diamond 250. There it may be determined whether the transaction queue level of a core exceeds a watermark threshold (diamond 250). That is, a core may have a transaction queue associated therewith that includes entries for all pending transactions of the core. Such transactions may include memory reads and writes, for example, among snoop traffic and other such bus transactions. If a significant amount of such entries are present, this is an indication of the amount of useful work being performed in the core that is dependent on message traffic. If the number of entries exceeds a watermark threshold, control may thus pass to block 240, discussed above, to enable message throttling. In this way, the message traffic associated with synchronization messages may be avoided, instead allowing the progress of useful work to proceed unimpeded by these synchronization messages. If instead at diamond 250, it is determined that the transaction queue level is less than the watermark threshold, control passes back to diamond 220 discussed above. While described with this particular implementation in the embodiment of FIG. 3, is to be understood that the scope of the present invention is not so limited.

Figure 4:
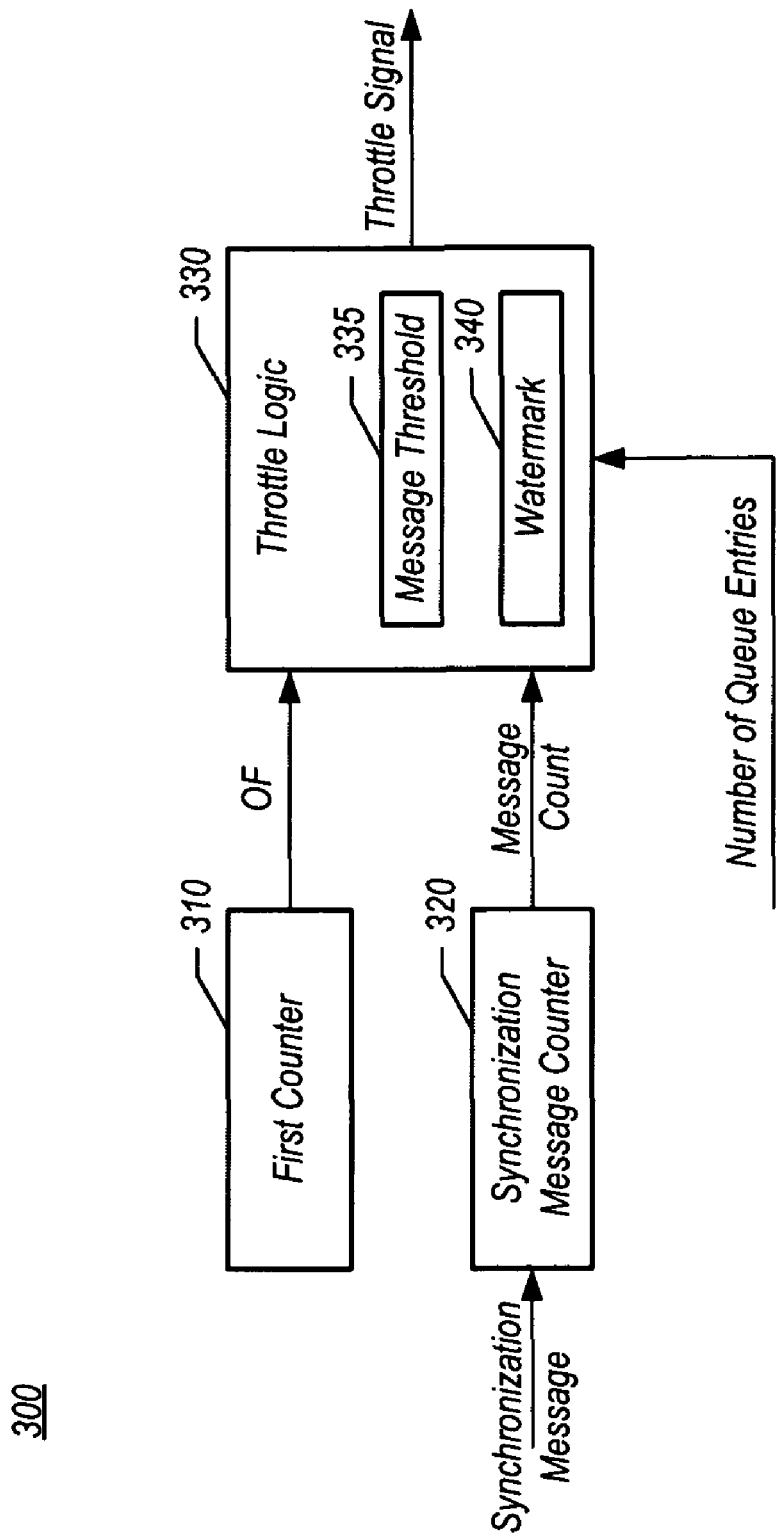
FIG. 4 is a block diagram of a throttle unit in accordance with one embodiment of the present invention.

Various manners of implementing a throttling mechanism may be realized in different embodiments. For example, hardware, software, firmware or combinations thereof may be used to perform throttling. Referring now to FIG. 4, shown is a block diagram of a throttle unit 300 in accordance with one embodiment of the present invention. In one embodiment, throttle unit 300 may be adapted within a message generation unit, for example, message unit 22 of FIG. 1. However, it is to be understood that throttle unit 300 may be located at other places, in other embodiments. Throttle unit 300 may include a first counter 310 having an overflow signal (OF) as an output thereof. First counter 310 may be adapted to continually count through a predetermined range and then overflow. A synchronization message counter 320 is coupled to receive a signal for each synchronization message generated by a core. Thus synchronization message counter 320 may generate a message count. The outputs of counters 310 and 320 may be coupled to a throttle logic 330. Throttle logic 330 may implement a method such as that described above with respect to FIG. 3 to determine whether to throttle synchronization messages based on various system parameters. Various thresholds may be stored in registers of throttle logic 330. For example, a first register 335 may store a message threshold, while a second register 340 may store a watermark threshold. These thresholds may be used as described above in FIG. 3 for comparison with various counts in an analysis of whether to throttle synchronization messages.

As further shown in FIG. 4, throttle logic 330 may be coupled to receive a signal corresponding to a number of queue entries. This number may correspond to a level of a transaction queue of an associated core, for example. Based on the various thresholds and the incoming counts, throttle logic 330 may determine whether to throttle synchronization messages. If throttling is to be activated, a throttle signal may be sent from throttle logic 330. In various embodiments, such a throttle signal may be sent to, e.g., a cache controller that transmits synchronization messages. While described what this particular implementation in the embodiment of FIG. 4, is to be understood that the scope of the present invention is not so limited.

Using various embodiments, synchronization messages may thus be sent from lower-level caches to higher-level caches. Based on these messages, age information of tag data associated with cache lines may be updated. When an eviction occurs in these higher-level caches, the updated recency information may prevent eviction of a cache line not recently accessed in the higher-level cache but recently accessed in a lower-level cache.

Figure 5:
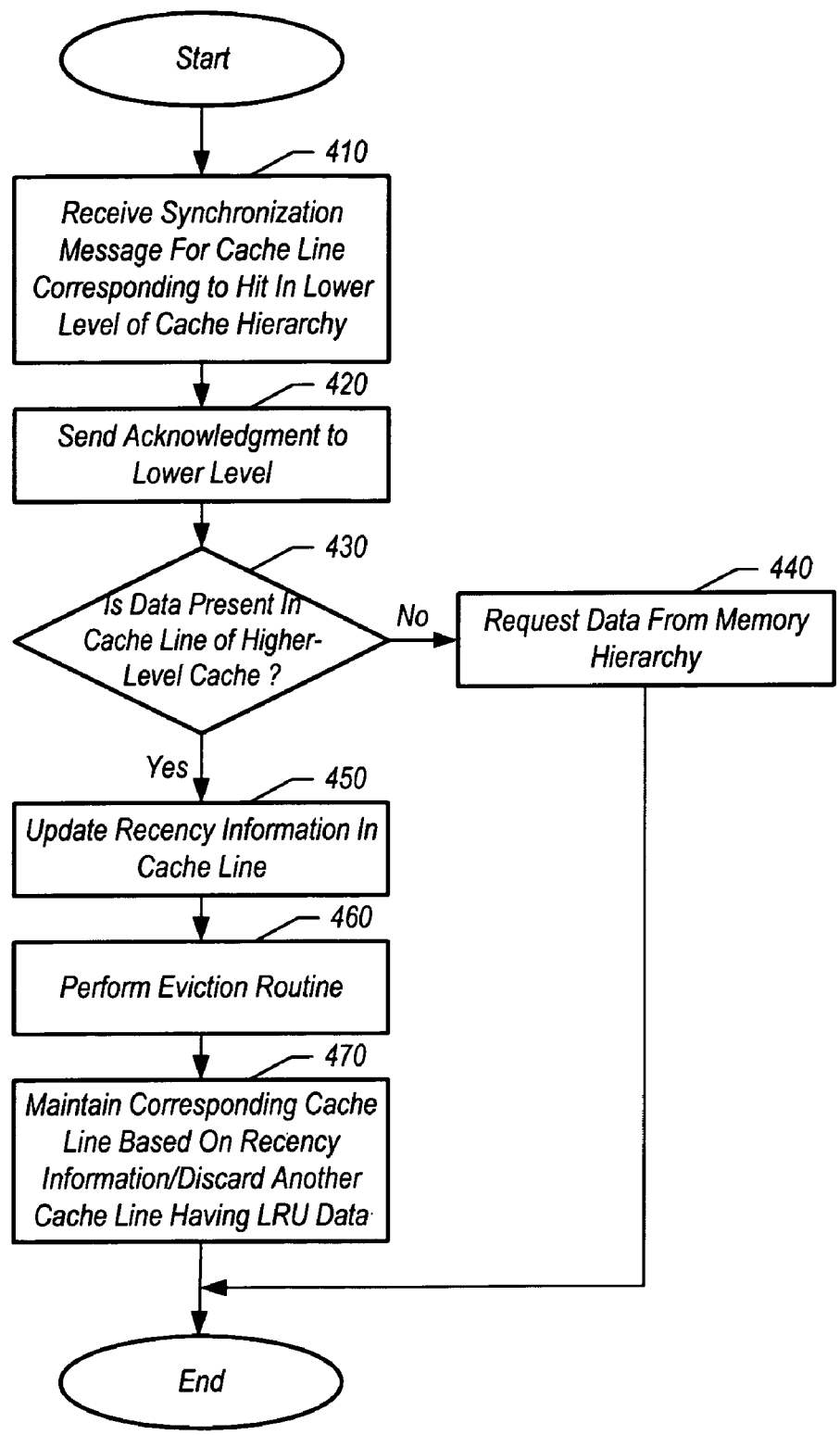
FIG. 5 is a flow diagram of a method in accordance with an embodiment of the present invention.

Referring now to FIG. 5, shown is a flow diagram of a method in accordance with one embodiment of the present invention. As shown in FIG. 5, method 400 may be used to create synchronization messages, transmit the messages to a higher-level cache, and update the higher-level cache with the message data. Referring to FIG. 5, method 400 may begin by receiving a synchronization message for a cache line corresponding to a line that was hit in a lower-level cache (block 410). While the content of this synchronization message may vary in different embodiments, in one embodiment the synchronization message may be a zero-length read request. Upon receipt of the synchronization message, the higher-level cache may send an acknowledgment signal back to the lower-level cache (block 420). In some implementations, this acknowledgment message may be a global observation (GO) signal, although the scope of the present invention is not so limited.

Still referring to FIG. 5, from block 420 control passes to diamond 430. There it may be determined whether a cache line corresponding to the synchronization message is present in the higher-level cache (block 430). Typically, in an inclusive cache memory hierarchy a cache line present in a lower-level cache should also be present in a corresponding higher-level cache, which includes the data of the lower-level cache. If, however, the data is not present in the higher-level cache, control may pass from diamond 430 to block 440. There, the data may be requested from other portions of a memory hierarchy (block 440). However, in other embodiments the message may instead be dropped and no further action taken with respect to the message. From block 440, method 400 may conclude.

Still referring to FIG. 5, if the data is present in a higher-level cache, control passes from diamond 430 to block 450. There the recency information for the associated cache line may be updated in the higher-level cache (block 450). For example, a cache tag for the associated cache line may be updated with the recency information. This recency information may vary in different embodiments, but may, for example, be a count value that is continually incremented for each transaction. In other embodiments, a timestamp-like value may be used, or another LRU indicator may be used. Accordingly, the higher-level cache may thus be updated with more accurate information regarding usage of its subsisting cache lines in lower-level caches.

Still referring to FIG. 5, during normal operation, a cache line may need to be evicted from the higher-level cache so that a new cache line can be inserted. Accordingly, the higher-level cache may perform an eviction routine to select a line for eviction (block 460). The eviction routine may take many different forms. In one embodiment, an LRU eviction scheme may be implemented. Accordingly, the higher-level cache may determine which cache line is the least recently used cache line, and may select that line for eviction. Due to the synchronization message sent for a recently used cache line in a lower-level cache (i.e., block 410), the corresponding cache line in the higher-level cache may be maintained based on its recency information, while a different cache line of the higher-level cache is instead discarded (both block 470). While described with this particular implementation the embodiment of FIG. 5, is to be understood that the scope of the present invention is not so limited and other manners of implementing synchronization messages and performing evictions may be effected.

Embodiments of the present invention may improve the accuracy of age information in a higher-level cache. In this way, the cache may make better decisions regarding eviction based on more globally accurate information. In various embodiments, the synchronization message may be a lightweight message, in that it does not seek return of any data. Thus in various embodiments, synchronization messages may allow higher-level caches to handle cache line replacements to effect optimal caching behavior in that an MRU cache line in a lower-level cache can be visible to the higher-level cache even in the absence of a cache miss.

Furthermore, in multi-core systems with more than one independent cache hierarchy sharing an inclusive higher-level cache, asymmetric access patterns to the higher-level cache amongst the cores can be evened out by sending synchronization messages, thus leading to fairer sharing of the higher-level cache. Accordingly, a core sending a small amount of cache misses to the higher-level cache can avoid negative performance impact via synchronization messages. Further by throttling synchronization messages in accordance with an embodiment of the present invention, a single core of a multi-core processor may be prevented from exceeding its fair bandwidth when that core suffers from high miss rates to its core caches, for example, when executing code streams.

Figure 6:
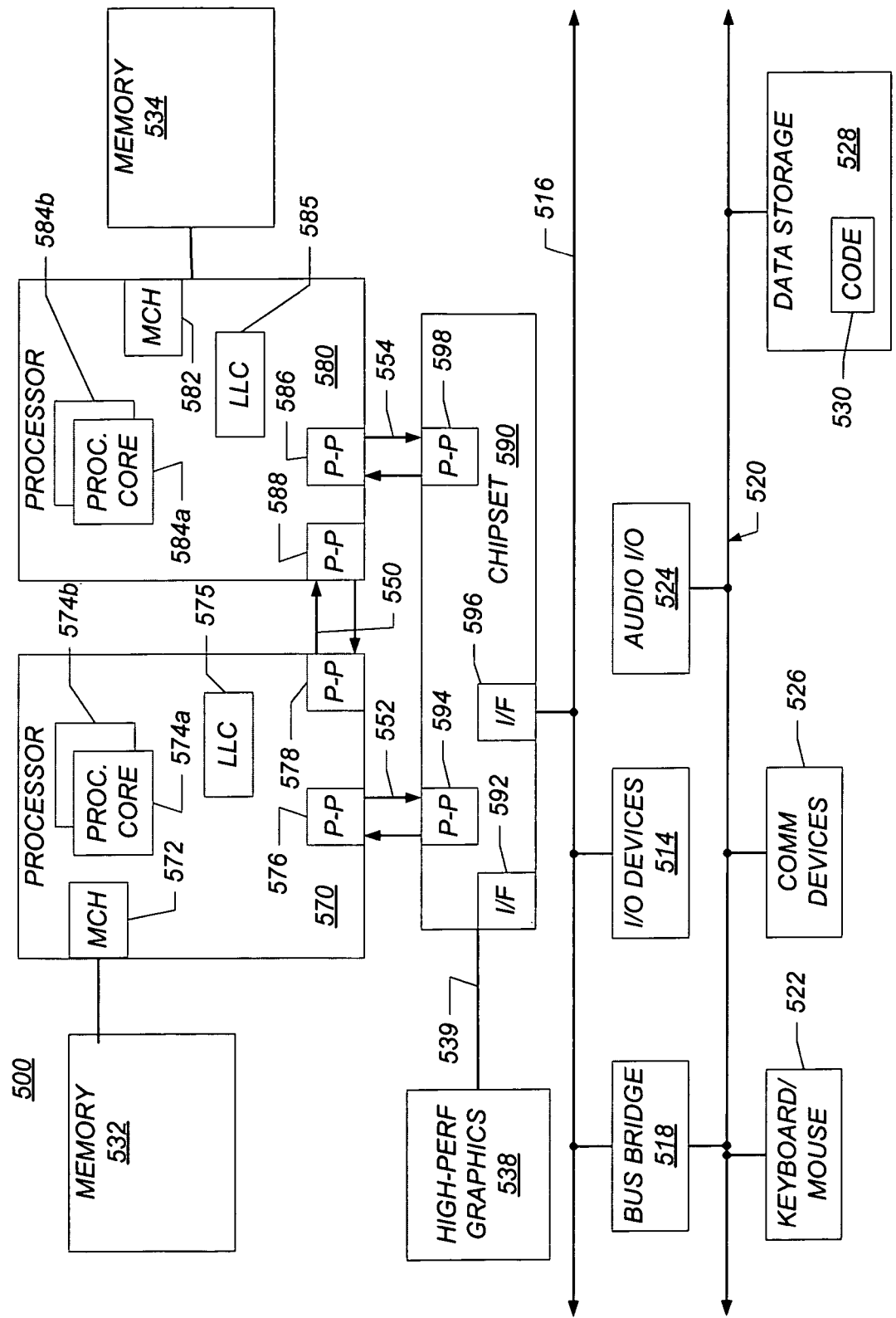
FIG. 6 is a block diagram of a multiprocessor system in accordance with an embodiment of the present invention.

Embodiments may be implemented in many different system types. Referring now to FIG. 6, shown is a block diagram of a multiprocessor system in accordance with an embodiment of the present invention. As shown in FIG. 6, multiprocessor system 500 is a point-to-point interconnect system, and includes a first processor 570 and a second processor 580 coupled via a point-to-point interconnect 550. However, in other embodiments the multiprocessor system may be of another bus architecture, such as a multi-drop bus or another such implementation. As shown in FIG. 6, each of processors 570 and 580 may be multi-core processors including first and second processor cores (i.e., processor cores 574a and 574b and processor cores 584a and 584b), although other cores and potentially many more other cores may be present in particular embodiments. While not shown in the embodiment of FIG. 6, is to be understood that the first and second processor cores may each include one or more cache memories. Furthermore, as shown in FIG. 6 a last-level cache memory 575 and 585 may be coupled to each pair of processor cores 574a and 574b and 584a and 584b, respectively. To improve performance in such an architecture, a cache controller or other control logic within processors 570 and 580 may generate, transmit, and/or throttle recency messages in accordance with an embodiment of the present invention.

Still referring to FIG. 6, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 6, MCH's 572 and 582 couple the processors to respective memories, namely a memory 532 and a memory 534, which may be portions of main memory locally attached to the respective processors.

First processor 570 and second processor 580 may be coupled to a chipset 590 via P-P interconnects 552 and 554, respectively. As shown in FIG. 6, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the Accelerated Graphics Port Interface Specification, Revision 2.0, published May 4, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the PCI Local Bus Specification, Production Version, Revision 2.1, dated June 1995 or a bus such as the PCI Express bus or another third generation input/output (I/O) interconnect bus, although the scope of the present invention is not so limited.

As shown in FIG. 6, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving a cache access request from a requester that hits data present in a lower-level cache line of a lower-level cache and providing the data to the requester from the lower-level cache; and
sending recency information regarding the lower-level cache line to a higher-level cache responsive to the hit comprising a zero-length read request that does not request a return of data, the higher-level cache inclusive with the lower-level cache, and not sending the recency information if the cache access request misses in the lower-level cache.

2. The method of claim 1, further comprising updating age data associated with a higher-level cache line of the higher-level cache corresponding to the lower-level cache line based on the recency information.

3. The method of claim 2, further comprising not evicting the higher-level cache line based at least in part on the age data, and evicting a second higher-level cache line having older age data associated therewith.

4. The method of claim 1, further comprising setting a higher-level cache line corresponding to the lower-level cache line to a most recently used status responsive to the zero-length read request.

5. The method of claim 1, further comprising sending recency information regarding cache access requests from a plurality of lower-level caches, each associated with one of a plurality of processor cores, to the higher-level cache.

6. The method of claim 5, further comprising throttling of sending the recency information regarding at least one of the plurality of lower-level caches.

7. The method of claim 6, further comprising throttling based on a bandwidth allocation for a processor core associated with the at least one of the plurality of lower-level caches.

8. An apparatus comprising:
a first level cache;
a second level cache coupled to the first level cache;
a message unit to generate a synchronization message as a read request having a length field of zero that does not request a return of data and to transmit the synchronization message to the second level cache if an access request received in the first level cache hits data present in the first level cache, the synchronization message including age information for a cache line in the first level cache that includes the data; and
a throttler to throttle the transmission if a threshold number of synchronization messages have been sent from the message unit in a first time period.

9. The apparatus of claim 8, wherein the message unit is to throttle the transmission based at least in part on transaction traffic of a core associated with the first level cache.

10. The apparatus of claim 9, wherein the throttler further comprises logic to determine if the transaction traffic is above a traffic threshold and if so, to throttle the transmission.

11. The apparatus of claim 8, wherein the second level cache is to update recency information for a cache line of the second level cache including the data responsive to the synchronization message.

12. The apparatus of claim 11, wherein the second level cache is to maintain the cache line including the data and to evict a different cache line, based at least in part on the recency information.

13. The apparatus of claim 8, wherein the second level cache is of a higher level than the first level cache.

14. An article comprising a machine-readable storage medium including instructions that if executed by a machine enable the machine to perform a method comprising:
determining a number of synchronization messages sent from a first cache to a second cache of a cache hierarchy in a time period, the synchronization messages each being a read request having a length field of zero that does not request a return of data; and
throttling the synchronization messages if the number of synchronization messages exceeds a message threshold.

15. The article of claim 14, wherein the method further comprises setting a throttle indicator if the number of synchronization messages exceeds the message threshold.

16. The article of claim 15, wherein the method further comprises clearing the throttle indicator after the time period.

17. The article of claim 14, wherein the method further comprises determining if a number of pending processor transactions exceeds a watermark threshold.

18. The article of claim 17, wherein the method further comprises throttling the synchronization messages if the number of pending processor transactions exceeds the watermark threshold.

19. The article of claim 14, wherein the method further comprises throttling synchronization messages from a first processor core to a shared cache memory while not throttling synchronization messages from a second processor core to the shared cache memory.

20. A system comprising:
a first processor core including a first cache memory and a message unit to generate synchronization messages, the message unit including a counter to count a number of synchronization messages generated in the first processor core and a throttle logic to throttle transmission of synchronization messages based at least in part on a level of pending transactions in the first processor core, wherein the synchronization messages each comprise a zero-length read request that does not request a return of data;
a second processor core including a second cache memory;
a shared cache memory coupled to the first processor core and the second processor core, wherein the first processor core is to send a synchronization message to the shared cache memory if a hit occurs in the first cache memory and transmission of synchronization messages is not throttled, and to not send the synchronization message to the shared cache memory if a miss occurs in the first cache memory; and
a dynamic random access memory (DRAM) coupled to the shared cache memory.

21. The system of claim 20, wherein the shared cache memory comprises an inclusive cache memory with respect to the first cache memory and the second cache memory.

22. The system of claim 20, further comprising a multi-core processor including the first processor core, the second processor core, and the shared cache memory.

23. The system of claim 20, wherein the throttle logic is to throttle transmission of synchronization messages based at least in part on a number of synchronization messages sent in a time period.

* * * * *